J. F. DORAN.
HAT CROWN POUNCING MACHINE.
APPLICATION FILED MAY 25, 1911.
1,110,192.
Patented Sept. 8, 1914.
6 SHEETS—SHEET 3.
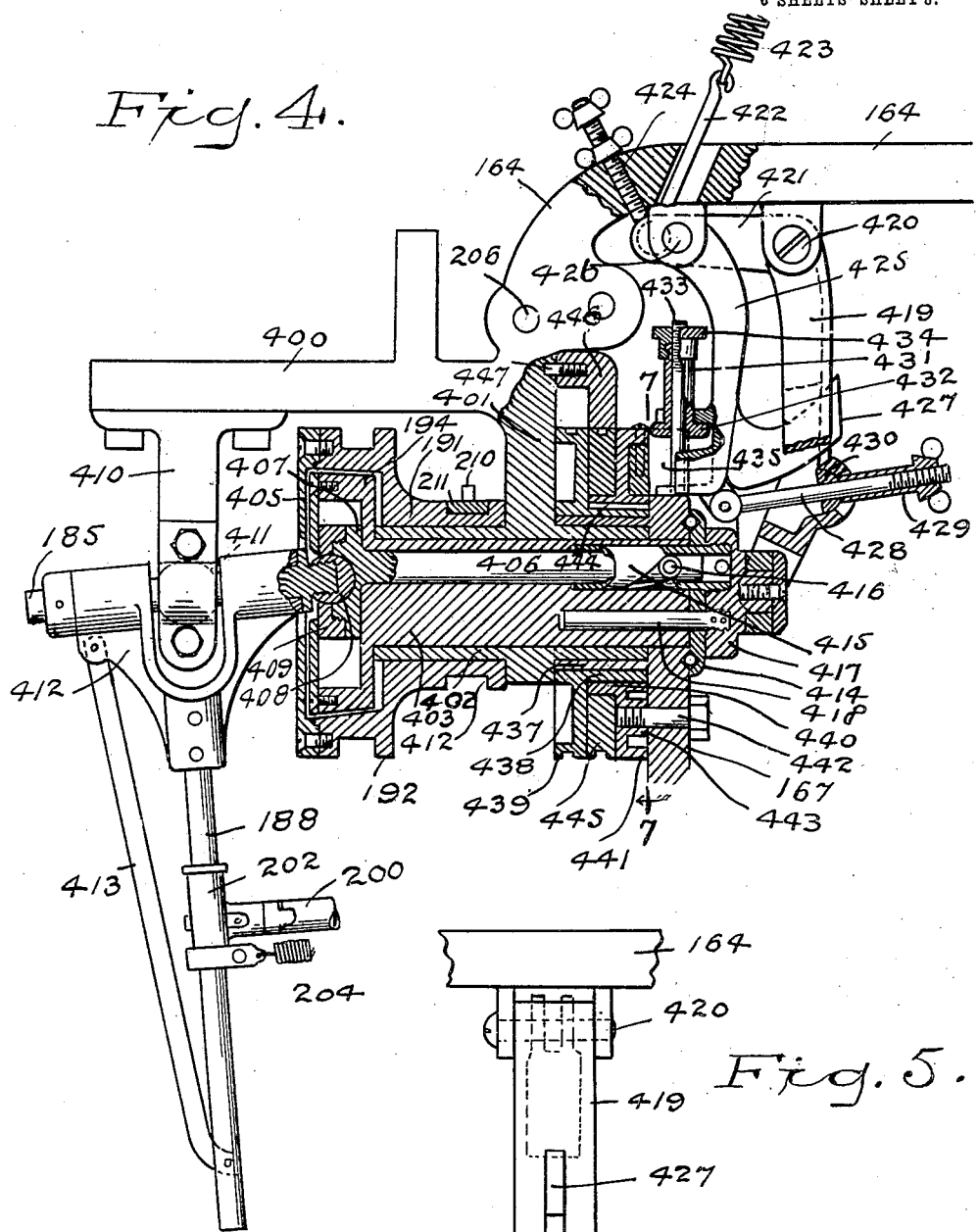
WITNESSES:
INVENTOR
ATTORNEY

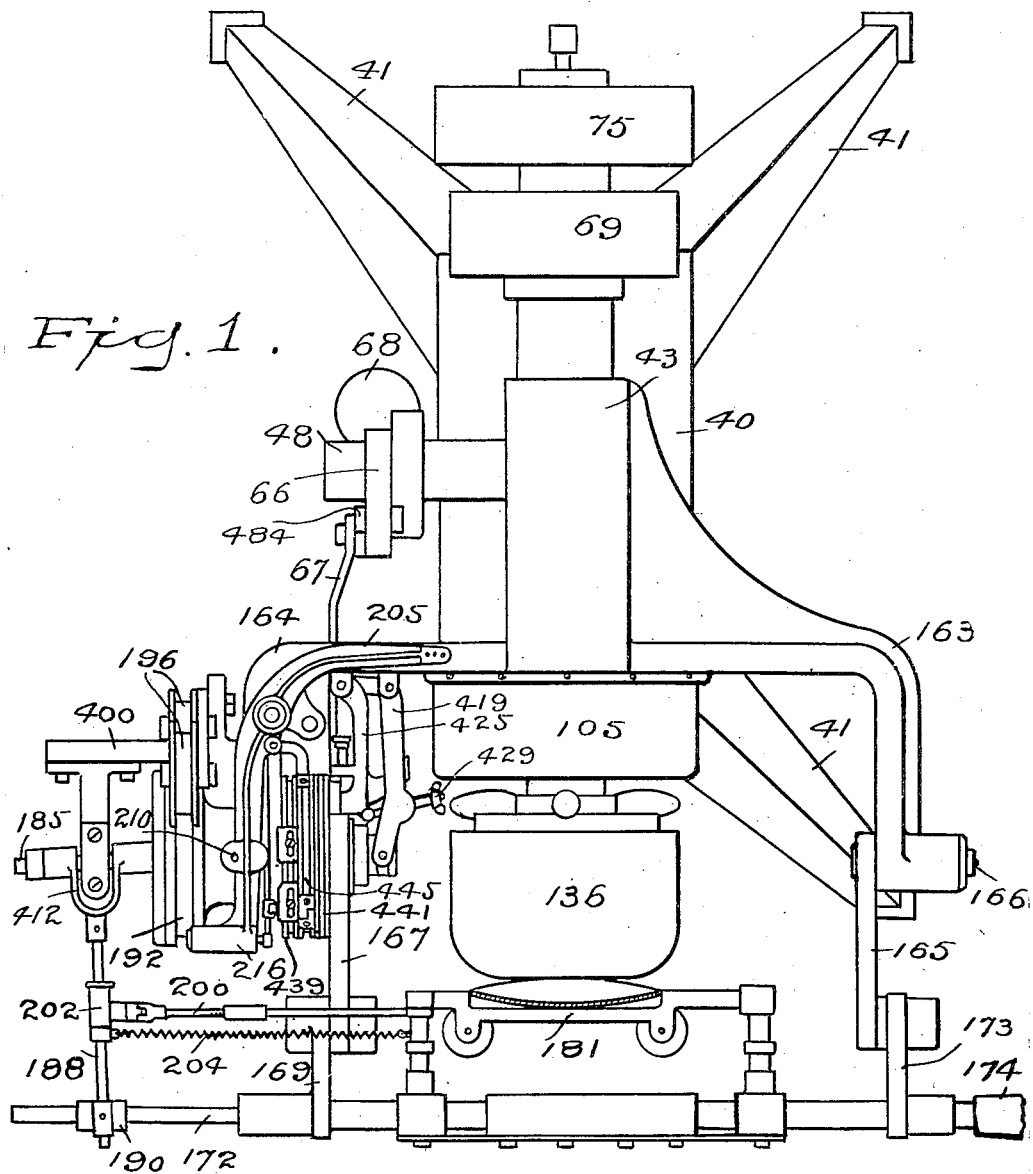

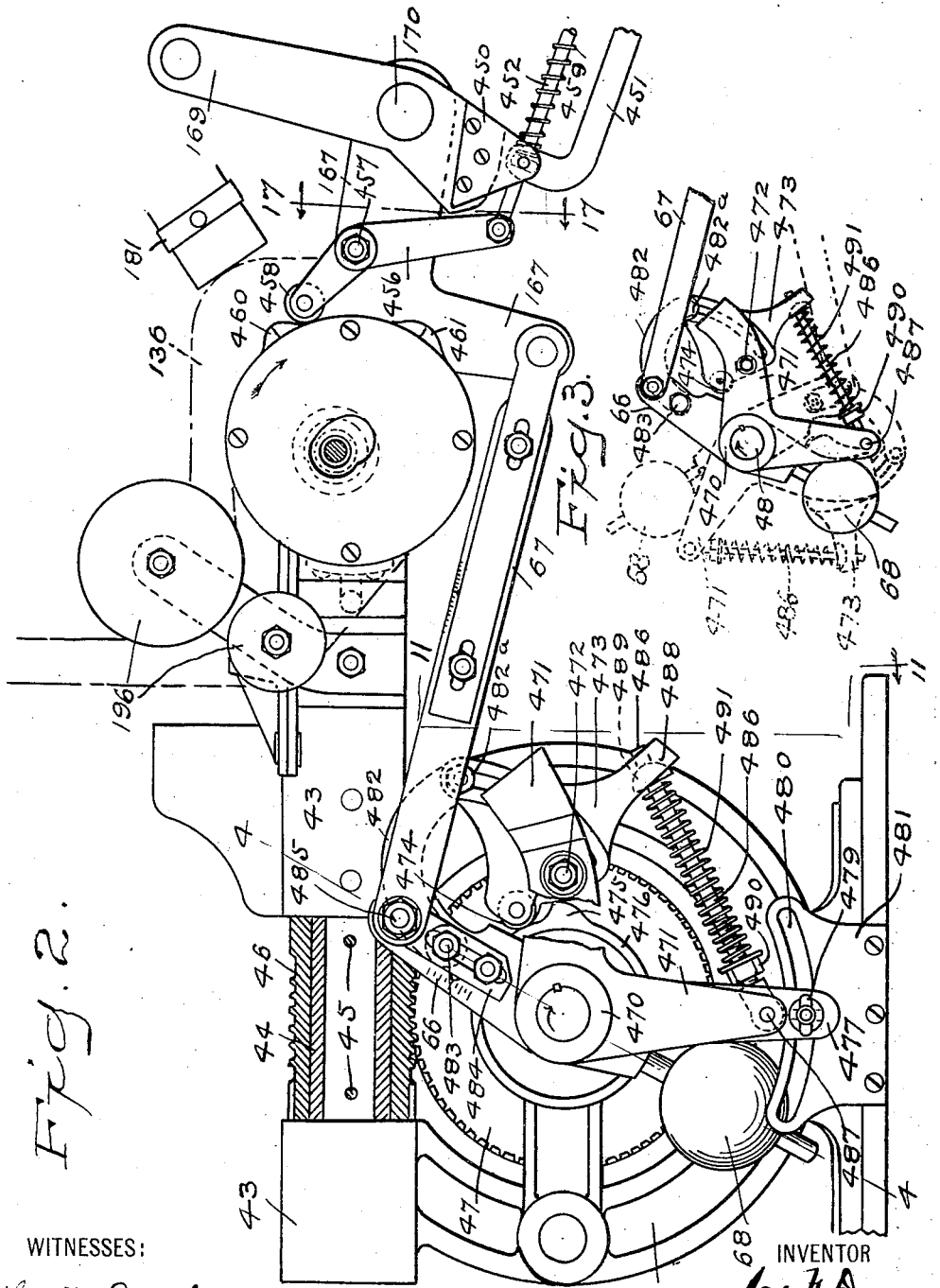

J. F. DORAN.
HAT CROWN POUNCING MACHINE.
APPLICATION FILED MAY 25, 1911.

1,110,192.

Patented Sept. 8, 1914.
6 SHEETS—SHEET 4.

WITNESSES:
H. A. Lamb
M. I. Lougden

INVENTOR
Jas. F. Doran
BY
ATTORNEY

J. F. DORAN.
HAT CROWN POUNCING MACHINE.
APPLICATION FILED MAY 25, 1911.
1,110,192.
Patented Sept. 8, 1914.
6 SHEETS—SHEET 5.
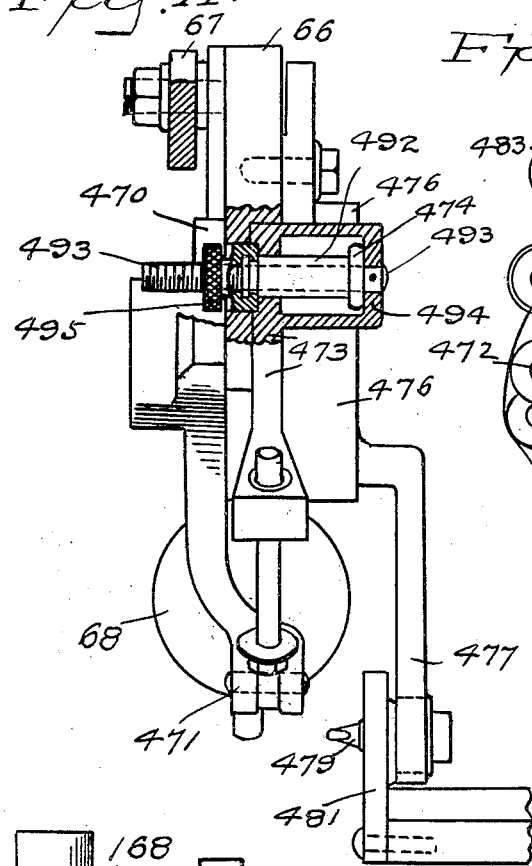
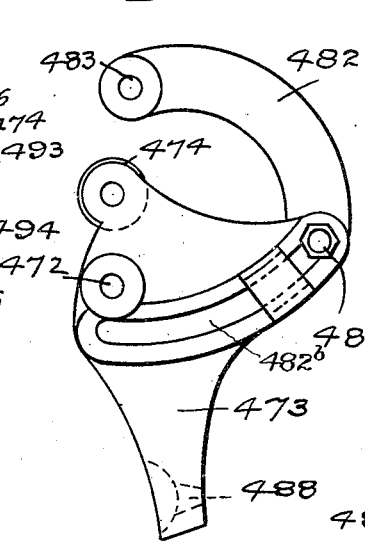
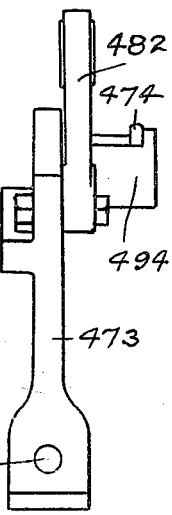
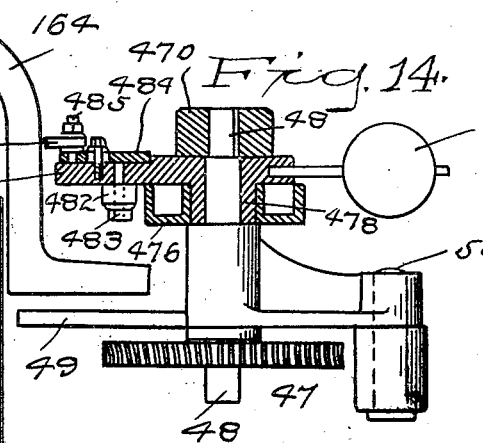

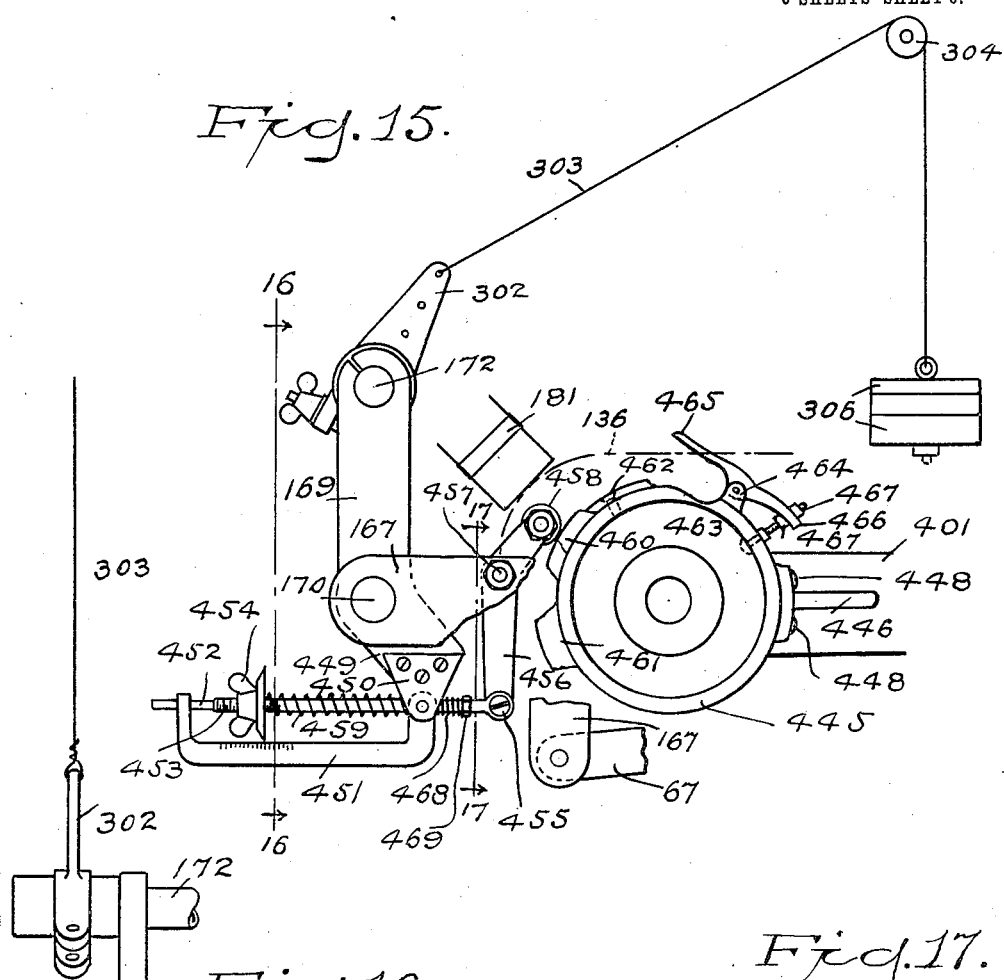

UNITED STATES PATENT OFFICE.

JAMES F. DORAN, OF DANBURY, CONNECTICUT.

HAT-CROWN-POUNCING MACHINE.

1,110,192.  Specification of Letters Patent.  Patented Sept. 8, 1914.

Application filed May 25, 1911. Serial No. 629,310.

*To all whom it may concern:*

Be it known that I, JAMES F. DORAN, a citizen of the United States, residing in the city of Danbury, county of Fairfield, State of Connecticut, have invented certain new and useful Improvements in Hat-Crown-Pouncing Machines; and I do declare the following to be a full, clear, and exact description of the invention, such as will enable others skilled in the art to which it appertains to make and use the same.

This invention relates to machines for finishing or sand-papering hat bodies, such machines being commonly known as pouncing machines, the hat body being mounted on a block which is slowly revolved during the operation of the member usually called the pouncing pad, such pad having independent operating movements of its own, and being also gradually shifted as to its position of operation on the hat.

The present invention relates more particularly to improvements in machines of this character such as are shown, described and claimed in my application filed March 18, 1911, Serial No. 615,228.

The objects of my present invention are to provide improvements which enable the length of the stroke of the pouncing pad to be automatically varied; also to reduce the speed of the reciprocations of the pad; also to provide for automatically reducing the pressure of the pad against the hat at certain portions of the surface thereof; and also to automatically govern the speed of traversing of the pad principally over the hat-body "squares."

With these and other objects in view my invention consists in the construction and combination of parts substantally as hereinafter described and claimed.

Figure 6:
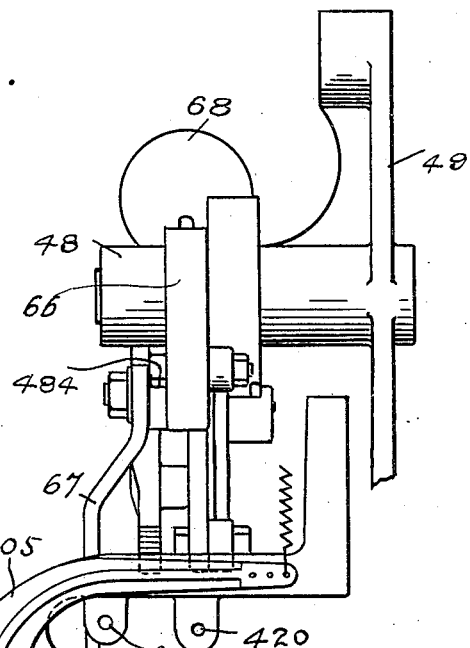
Figure 7:
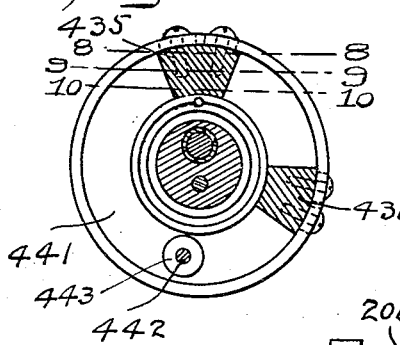

Of the accompanying drawings Figure 1 is a plan view of so much of the complete machine as is necessary to illustrate my present improvements, it being understood that such details as do not appear in Fig. 1 are such may be the same as in my said application No. 615,228—Fig. 2 is a side elevation of a portion of the machine looking from the left of Fig. 1—Fig. 3 is a diagrammatic view illustrating some of the mechanism of Fig. 2 in different positions—Fig. 4 is a plan view, partly in section on line 4—4 of Fig. 2—Fig. 5 is a detail side elevation of a portion of the mechanism shown in Fig. 4, looking from the right of said Fig. 4—Fig. 6 is a plan view of a portion of the mechanism shown in Fig. 1, on an enlarged scale—Fig. 7 represents a section on line 7—7 of Fig. 4—Figs. 8, 9, and 10, are sectional views of one of the cams, said three figures being on the lines 8, 9, and 10, respectively of Fig. 7—Fig. 11 is a detail view, partly in section on line 11—11 of Fig. 2—Fig. 12 is a side elevation of one of the levers and links shown in Fig. 11—Fig. 13 is a view looking from the right of Fig. 12—Fig. 14 is a detail plan view of parts of the mechanism shown in Fig. 1—Fig. 15 is a detail side elevation of some of the portions of the machine shown in Fig. 2, but looking in a direction opposite to that in Fig. 2—Fig. 16 represents a section on the line 16—16 of Fig. 15—Fig. 17 represents a section on the line 17—17 of Figs. 2 and 15—Fig. 18 is a somewhat diagrammatic view illustrating the means for adjustably connecting a cam structure to the carrying disk therefor.

Similar numerals of reference denote like parts in the several figures of the drawing.

Reference numerals employed in the following description below 400 are used to indicate parts of the machine which are identical with or substantially like similar parts in my former application No. 615,228, to which reference may be had if necessary for a more complete understanding of parts designated by such numerals below 400. A brief description will be given, however, of the parts of the machine which are the same as in my said former application.

The base or table 40 of the machine is shown as supported by suitable legs 41, and, in turn, supports the frame of the machine, said frame comprising a circular portion 42 and an upper horizontal portion 43 which forms a bearing for a tubular shaft 44. Secured on said shaft as by pins 45 is a worm 46 which meshes with and drives a worm wheel 47 the latter being secured to a stud shaft 48 mounted in a bearing provided in a lever 49 pivoted at 50 to the frame 42.

Mounted on the stud shaft 48 is a crank 66 which is connected by a link 67 with the swinging frame of the pouncing pad or tool to actuate said frame as hereinbefore described. In the present machine the link 67 is adjustable in length, as clearly indicated in Fig. 2. To prevent a dead center position of the crank and link, said crank is formed with a rearward extension having a weight 68.

Suitably secured to the rear of the frame is a casing 69 which contains differential power transmitting gearing of a type which need not be described or illustrated in detail herein. The driving pulley is indicated at 75. A front casing 105 contains mechanism which controls the vertical position of the axis of the hat-block 136 as fully described in my said application No. 615,228.

Projecting from opposite sides of the frame 43 are two rigid arms 163, 164. A link 165 is pivotally connected at 166 with the rigid arm 163, and a T-lever 167 is pivotally connected with rigid arm 164. The short arm of the T-lever 167 is connected by the link 67 with the crank 66 so that, as shaft 48 rotates, the T-lever is actuated to swing the pouncing tool over the hat body. A lever 169 is pivoted to the T-lever, and an arm 173 is supported by the link arm 165. A rod 172 for the pouncer frame is mounted in suitable bearings in the outer ends of lever 169 and arm 173, said rod 172 having a handle 174 at one end to enable the rod of the pouncer to be shifted manually to position for commencing operation on a hat body.

The pad or operating tool is indicated as a whole at 181 and it is mounted so that it can be reciprocated in a plane substantially parallel with the rod 172. Reciprocatory movements are imparted to the pad by means of the wrist pin 185 which actuates the arm 188 and, through the sleeve 202 and link 200, imparts the necessary movements to the pad. A portion of my present improvement relates to the structure and means for actuating the wrist pin and I will now proceed to describe the same.

Refering chiefly to Fig. 4 of the drawing, it will be seen that the arm 164 is formed with two extensions 400, 401, substantially at a right angle to each other. The extension 401 has a sleeve or tubular bearing 402 in which is mounted the hub 403 of the cone disk 194. Mounted to revolve on said sleeve 402 is the hub 191 of the pulley 192, said pulley surrounding the cone disk 194 and being so shaped relatively thereto that when said pulley is shifted slightly longitudinally of its bearing it may grip the cone pulley with more or less firmness so as to rotate the latter with greater or less speed as explained in my said application No. 615,228. The pulley is provided with a plate 405 which serves to cover the annular chamber in which the cone disk 194 is located, and this disk is preferably provided with a plate 194ᴬ located between the outer undercut face of said disk and the plate 405. There should be play or looseness between the outer face of this plate 194ᴬ and the inner face of the plate 405 so as to allow a free lateral movement of the pulley 192, as has been hereinbefore described. The hub 403 is bored longitudinally but eccentric of its axis as indicated also in Fig. 7, to receive a shaft 406 having a head 407 the latter having its face formed with a concave recess the center of which is eccentric of the center of shaft 406, said recess forming a seat for a ball 408 secured to the inner end of wrist pin 185. The ball is retained in its seat by an outer bearing member 409 which forms the outer half box to coact with the head 407 in forming the bearing for the ball 408. The outer face of the member 409 should bear against the inner face of the disk plate 194ᴬ so as to prevent undue lateral movement in the direction of the plate 405.

Referring to the construction so far described it will be readily understood that if the shaft 406 be adjusted on its own axis so as to shift the center of the bearing for the ball 408 toward or from the axis of the hub 403, then the rotation of said hub by a belt running on the pulley 192 will vary the radius of the circular path of travel of the ball 408. Such rotation of the hub 403 is of course effected only when the pulley 192 is shifted in the manner described in my said application No. 615,228, to bring about more or less close frictional contact with the cone disk 194.

A bracket 410 carried by extension 400, supports a bearing for a spherical shaped enlargement 411 of the wrist pin 185 as indicated by dotted lines in Fig. 4.

Mounted on the wrist pin 185 is a yoke 412 to which is secured the arm 188. A brace 413 may be employed as indicated in Fig. 4 to strengthen the arm 188 in the direction of movement of the latter which imparts movements to the pad, through the sleeve 202, link 200, and spring 204, as explained in my prior application referred to. Of course the length of reciprocations of the pad may be varied by shifting the point of connection of the sleeve 202 toward or from the fulcrum of the arm 188, said fulcrum being of course the spherical enlargement 411. This shifting of the sleeve 202 will only provide for manual adjustments of the length of the reciprocations of the pad. Automatic varying of the length of such reciprocations is effected by the means which I will now proceed to describe for varying the radius of the throw imparted to the ball 408.

The hub 403 extends into the T-lever 167 so that the latter may turn on said hub, as the pad swings over the hat, and the inner end of said hub has affixed to it a cap or plate 414 between which and the adjacent face of the lever 167 are suitable ball bearings which take up the thrust. The bore in the hub 403 for the shaft 406 is enlarged at one end so as to receive a sleeve 415, said sleeve being formed with one or more spiral slots receiving rollers 416 projecting radially from the shaft 406. The sleeve 415 is movable longitudinally of its bearing so that its spiral slot or slots will act through the roller or rollers 416 to rotate the shaft 406 and so adjust the axis of the ball joint 408 relatively to the axis of the hub 403. The sleeve 415 projects through the cap 414 and is rigidly secured at its upper end to a cap 417 which has a guide pin 418 projecting through cap 414 into the hub 403. Therefore, the cap 417 may be adjusted longitudinally of the hub 403 so as to cause the adjustments of shaft 406 as described. The means for automatically shifting the cap 417 will now be described.

A lever 419 is pivotally connected at 420 to an ear or bracket of the frame 164, said lever having its outer end connected to the cap 417 in a manner to permit the said cap to be shifted in the direction described, by means of said lever. A short arm 421 of said lever is provided with a hook 422 projecting through a slot in the arm 164, a spring 423 being connected at one end to said hook and at the other end to a suitable fixed portion of the machine to keep the lever normally in the position shown in Fig. 4. This normal position may however be varied by means of an adjustable stop screw 424 against which the end of the arm 421 bears. A lever 425 is pivotally supported at 426 and has a guide lug 427 passing through a slot of lever 419 to steady the lever 425 against lateral deflection. Pivotally connected with the inner end of lever 425 is a rod 428 having a sleeve or elongated nut 429 adjustably mounted on its outer end. Said sleeve 429 has a hemi-spherical enlargement 430 at its inner end which engages a correspondingly formed recess in the lever 419. This construction is such that anything which acts outwardly from the lever 425 will act to thrust the lever 419 toward the right from the position shown in Fig. 4, against the force of spring 423. Mounted in a lug of the lever 425 is a sleeve 431 having its inner end enlarged to form a roller 432. Extending through said sleeve is a stud shaft 433 having its inner end fixedly connected to a lug at the end of lever 425, and having its outer end screw threaded. Mounted on said screw threaded portion is a nut 434 which has a rotative connection with the end of sleeve 431 so as to enable said sleeve and its roller 432 to be adjusted along the stud shaft and still permit the roller and sleeve to revolve on said stud shaft. A cam which will presently be described so acts upon the roller 432 as to swing the lever 425 outwardly and vary the position of the crank controlling sleeve 415 in the manner hereinbefore described. In Fig. 4 one of said cams is indicated in outline at 435, but for a clearer illustration of it, reference will be hereinafter made to Figs. 7, 8, 9, and 10.

Figure 8:

The lever 167 is formed or provided with a hub portion 437 which incloses a portion of the tubular bearing or sleeve 402. Mounted on the hub 437 is the hub 438 of a disk 439. Mounted on said hub 438 is the hub 440 of a disk 441, the latter being held against movement relatively to the T-lever 167 by means of a screw 442 passing into a boss 443 of disk 441. The two hubs 438, 440, are locked against relative rotative movement by a pin 444 driven into a hole formed by coinciding grooves in the faces of said hubs. Mounted on the hub 440 is a disk 445, said disk having no connection with the disks 439, 441, but merely being held in place thereby. The disk 445 is held in non-rotative position by an anchor block 446 secured, as by a screw 447, to the extension 400 and secured to the disk 445 as by screws 448 (see Fig. 15). It will now be understood that the disk 445 is mounted in fixed position, and that the disks 439, 441, possess rotative movements relatively to the disk 445, owing to the locking of the two disks 439, 441, together, and the securing of the disk 441 to the lever 167 by the screw 442. As the T-lever 167 swings on the axis of the sleeve bearing 402, during the movements of the pad over the hat in a direction from brim to apex or vice versa, the disks 439, 441, oscillate and the cam 435 carried by the disk 441 will act upon the roller 432 to cause the variations of the length of the reciprocations of the pad through the mechanism hereinbefore described. Preferably the disk 441 carries two cams 435, 436, as indicated in Fig. 7. Each of these cams is adjustably secured in position as by means of screws passing through slotted openings in the flange of the disk 441 and into the bases of the cams, so that said cams can be adjusted to any necessary extent circumferentially of the disks. As indicated by comparing Figs. 8, 9, and 10, with the section lines therefor on Fig. 7, it will be seen that the cam 435 is of such shape that when the roller 432 is adjusted to such position as indicated in Fig. 4, the shifting effect of the cam on the roller will be prolonged, such effect being diminished if the roller be adjusted inwardly on the stud shaft 433. The adjustment of the roller 432 is effected manually to suit different shapes of hats being pounced. The cam 435 is so located on the disk 441 as to act on the roller 432 at a time when the pad is being shifted over what is known as the "square" or "danger point" of the hat. When the cam 435 acts it effects the shifting of the axis of ball 408 toward or to the axis of rotation of the hub 403 and consequently diminishes the amount of throw imparted to the arm 188. It may be mentioned here that the drawings are not to be understood as representing the exact shape of the cams in all instances, the Figs. 8, 9, and 10, being conventional ones. If the hat body being pounced has a "full round square" the roller 432 will be adjusted to a position substantially as shown in Fig. 4, where it will be acted upon by a portion of the cam 435 having the shape somewhat as indicated in Fig. 8, whereas if the hat being operated upon has a "sharp square" then the roller 432 is adjusted so that it will be acted upon by a portion of the cam 435 having a shape approximating that illustrated in Fig. 10. As has been stated, the cam 435 is so rotated as to perform its function when the pad is being shifted over the "square" of the hat. The cam 436, which will be of suitable conformation, is so located upon the disk 441 as to act upon the roller 432 and reduce the length of the reciprocations of the pad to nothing when the pad reaches the apex of the crown and is about to drop away, so that while the pad is not in contact with the hat body it will be inactive in its reciprocations. The disk 441 may carry cams of such shape and of such number as to act in the manner described to reduce or stop reciprocations of the pad at any point of the hat body. Sometimes hat bodies of peculiar shape, and which may be termed "freak hats," present a plurality of "danger points" which need to be considered in the operation of the machine, to the extent of effecting variations in the reciprocations of the pad.

As will now be understood, the amount or degree of reduction of the stroke of the arm 188 and pad is governed by the adjustment of sleeve 429 on rod 428. Since the latter is connected to lever 425 which carries roller 432, and since the only connection between the two levers 419 and 425 is through the medium of said rod 428 and sleeve 429, the said sleeve may be adjusted inwardly of rod 428 so that there may be more or less lost motion between the head or enlargement 430 and lever 419, before the effect of cam 435 or 436 is transmitted to lever 419. By adjusting the sleeve nut to a sufficient extent to cause the head 430 to never contact with the lever 419, no change of length of stroke will occur. No such change is necessary as far as the square is concerned when pouncing a soft round hat having practically no "danger point."

If it should be desired to manually produce such adjustment as will prevent all reciprocations of the pad at the "square" or any other predetermined position, the same may be effected by adjusting the screw 424 so far inwardly as to shift the lever 419 to a point that will result in bringing the axis of ball 408 into line with the axis of hub 403. Adjustment of lever 419 to such a point would carry it outward beyond reach of contact of the head 430 of sleeve 429 carried by rod 428. Of course instead of the screw 424, any suitable mechanical equivalent therefor, that is capable of quicker adjustment, may be provided.

Figure 9:
Figure 10:
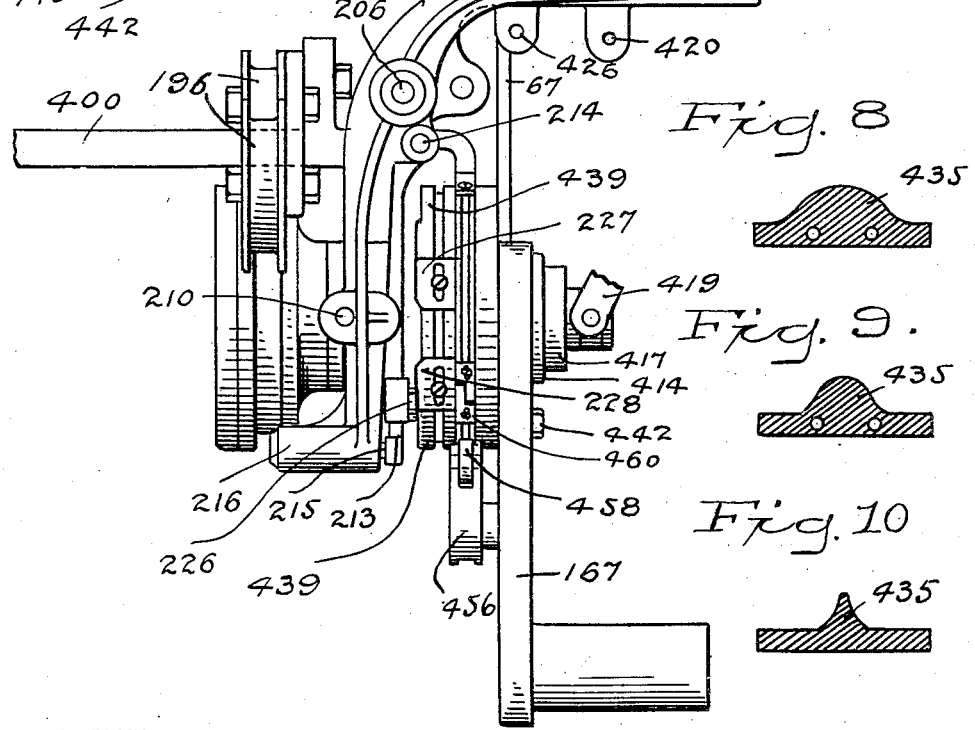

The time when the reduction of the stroke occurs is governed by the position of the cams 435, 436, around the periphery of the disk 441; the duration of effect of the cams is governed by adjusting the roller 432 so that it may be acted upon by a wider or a narrower portion of the cams such as indicated in Figs. 8, 9, and 10, and the amount of variation of stroke is governed by adjustment of the sleeve nut 429. As the cams 435, 436 are removably connected with the disk 441, different shapes of cam blocks may be employed.

The advantages of the mechanism described whereby the length of the stroke of the pad may be varied are many but need not be described in detail herein. The length of reciprocatory travel is adapted to be changed in accordance with the convexity of the part being operated upon in the direction of the path of travel of the tool between apex and band portion.

I will now describe the mechanism for reducing the speed of the reciprocations of the pad, with the prefatory remark that said mechanism is not widely different from the structure of my said application No. 615,228.

Referring to Figs. 1 and 6 an elbow lever 205 is pivoted at 206 to the frame arm 164. Near its outer end the lever 205 is connected by a pin 210 with a shoe 211 (see Fig. 4) fitting an annular groove 212 in the hub 191 of the pulley 192. A supplemental arm 213 is pivoted to the lever 205 at 214 and has a stud 215 at its outer end which is acted upon by a spring, not shown, in a barrel 216 at the outer end of lever 205. A roller 226 is carried by arm 213 in position to be acted upon by the side face of disk 439 or by the cams 227, 228, adjustably mounted on said disk 439, all in a manner similar to that more fully described in my said earlier application. The cam disk 439 has been described above as to its mounting, but the cam segments carried thereby act, through the lever 205 and connected parts, to reduce the speed of reciprocations of the pad in a similar manner to the structure in my said earlier application.

I will now describe the mechanism illustrated for reducing the pressure of the pad when passing over the "square" referring especially to Figs. 2, 6, and 15. As has been mentioned, the rod 172 for the pouncer is mounted in two arms or levers, one of which is shown at 169 in Fig. 15. In the present structure said lever 169, which is pivoted at 170 to an arm of the T-lever, is provided with a downwardly inclined short arm 449 carrying one or more cheek pieces 450 in which is pivotally mounted a bar 451. Slidably mounted in an upturned outer end of bar 451 is a rod 452 having a screw threaded portion 453 on which is mounted a nut 454. The other end of the rod 452 is pivotally connected at 455 to the lower end of a lever 456 which in turn is pivotally mounted at 457 to the T-lever 167, the upper end of said lever 456 carrying a pin provided with a roll 458. A spring 459 is interposed between the nut 454 and a suitable stop at the swiveled point of the bar 451, provision being made for the rod 452 to pass freely through such slot, adjustment of the nut 454 therefore varying the expansive force of the spring 459. The disk 445 is provided with two adjustable cams 460, 461. The cam 460 is preferably made of two members with portions overlapping each other as best shown in Fig. 18, the two members being secured to the periphery of disk 445 by screws 462 passing through slots in the cam members into the disk 445. This structure enables the length of the cam to be adjusted to vary the duration of the effect of such cam according to the shape of the "square." The cam 461 might also be made of two members and secured in a similar manner. As has been mentioned, the disk 445 has no rotative movement, being held by the anchor block 446. Consequently the cams 460, 461, are stationary but adjustable on said disk. When the T-lever 167 oscillates on its axis, which is concentric with the center of disk 445, the roll 458 encounters the cam 460 in such manner as to oscillate the lever 456 on its pivot and draw the rod 452 in such a direction as to cause the spring 459 to exert a yielding pressure on the lower arm 449 of the lever 169 that will tend to reduce the pressure of the pad carried by the frame 181 which is indicated diagrammatically in Fig. 15 at the point where it is in contact with the "square" of the hat body. As shown in said Fig. 15, the cam 460 is holding the parts, or acting upon them, in the manner just described. The cam 461 is located in such position that the roll 458 will ride onto it and again release the pressure of the pad when said pad reaches the apex of the crown. The cam 461 is preferably of a height that will so act upon the lever 456 as to entirely separate the pad from the surface of the hat body when the apex is reached. Owing to the fact that both of the cams 460, 461, are adjustable around the periphery of the disk 445, they may be so positioned on said disk that they will perform their respective operations just described at the proper times during the traverse of the pad or tool from the brim portion to the apex or vice versa, to suit any shape of hat. Of course, as has been described in my said earlier application, the weights 306 act through the cord or chain 303, running over a pulley 304 to the arm 302, to draw the pouncing frame toward the hat. By the construction illustrated in Fig. 15 the spring 459 may be so regulated by the nut 454 as to counteract to a greater or lesser degree the pressure of the pad due to the weights just mentioned and due to its own weight and parts immediately connected thereto. The nut 454 may be adjusted so as to entirely remove the effects of the spring, if desired. On the other hand, it may be adjusted to compress the spring with such force that said spring, when the cam 460 acts, will entirely take off the pressure of the pad when passing over a sharp "square."

It is sometimes desirable to exert an extra heavy pressure of the pad upon portions of the hat body near the brim. Means for effecting this are indicated in Fig. 15 wherein it will be seen that a portion of the disk 445 is cut away as shown at 463 so that the roll 458 may pass into the recess or depression at the time when the pad or tool approaches the brim of the hat body. Pivotally connected to a lug 464 of the disk 445, is a lever having an arm 465 under which the roll 458 will pass to be positively carried into the depression 463. The rear arm 466 of the lever is adjustably connected with the periphery of the disk 445 by a bolt having set nuts 467. By adjustment of said nuts, the position of the arm 465 may be varied to cause the roll 453 to be carried more or less closely into the recess 463. In order that the positive motion imparted by the cam arm 465 to the lever 456 may be yieldingly transmitted to the arm 449 and lever 169 and through the latter to the pad or tool, a spring 468 is shown as mounted upon the rod 452 between a stop thereon (not shown) and an adjustable nut 469. By a similar structure of cam lever adjustably secured to the disk 445, a similar increase of pressure may be exerted on any portion of the hat body.

The mechanism for automatically governing the speed of traversing of the pad over the hat body "squares" will now be described, referring especially to Figs. 2, 3, 11, 12, 13, and 14. The arm 66 which transmits motion to the T-lever 167 through the adjustable link 67 instead of being keyed or pinned to the shaft 48 is mounted loosely on said shaft and has motion transmitted to it from said shaft 48 through the following intermediate mechanism: Keyed or pinned to the shaft 48 is the hub 470 of an elbow lever 471, said lever having pivoted to it at 472 a supplemental lever 473 which carries a roll 474 which is acted upon by a cam 475 carried by a circular member or hub 476 having an arm 477 the purpose of which will be presently described. The hub 476 is mounted on the hub of arm 66 and can be adjusted on the axis of said arm or the axis of shaft 48 as best indicated in Fig. 2. For this purpose, the arm 477 carries a clamping bolt 479 passing through a curved slot 480 formed in a fixed bracket 481. By swinging the arm 477 and securing the bolt 479 in desired position along the slot 480, the position of the cam 475 may be varied. Since the worm wheel 47 is shifted to and from engagement with the worm 46 at times as explained in my former application, the portion of the arm 477 through which the clamping bolt passes is provided with a vertical slot so as to permit the arm 477 to move vertically when the worm wheel 47 is shifted vertically. Of course the clamping bolt is of a type which clamps only the bracket 481 and prevents lateral movement of the arm 477. A curved link 482 is connected at one end to the lever 473 by a pivot 482ª which is adjustable along a curved slot 482ᵇ in said lever 473. The other end of the link 482 is pivotally connected to the arm 66 at 483. The connection of the link 67 with the arm 66 is through the medium of an extension piece 484 that is adjustably secured to the arm 66 by means of suitable bolt and slot connections so that the pivotal point 485 between said extension 484 and link 67, may be varied so as to practically constitute an adjustable crank connection to vary the amount of throw imparted to the T-lever through the link 67 according to the distance of the pivot 485 from the axis of shaft 48. As the shaft 48 revolves in the direction of the arrow in Figs. 2 and 3, the pivot 472 of the elbow lever travels also and acts through the lever 473 and link 482 to cause the arm 66 to travel in the same direction. If there were no cam 475 present, the rotary motion of the arm 66 would be constant. But when the roll 474 reaches the cam 475, the lever 473 is oscillated on its pivot 472 so as to impart a sudden increase of movement to the arm 66 through the link 482, and consequently actuate the T-lever 167 (through the link 67) with a sudden access of motion. As indicated in Fig. 2, this occurs as the pad or tool reaches the "square" of the hat. In order that the roll 474 will be caused to follow the contour of the hub 476 when not in engagement with the cam 475, a spring connection is employed between the lower arm of lever 473 and the lower arm of lever 471. This comprises a rod 486 pivotally connected at 487 to the lower arm of lever 471, the outer end of said rod passing freely through an aperture 488 in the lower arm of lever 473, said aperture being indicated by dotted lines in Fig. 12. Bearing against a concave recess in the side of the lower arm of lever 473 is a hemi-spherical washer 489 loose on rod 486 between which washer and an adjustable nut 490 on the rod 486 is a spring 491. By adjusting the nut 490, the spring may be more or less compressed as may be desired. As the shaft 48 revolves the motion thereof is transmitted so as to traverse the pad over the surface of the hat, through the following connections, viz: the upper arm of lever 471, pivot 472, lever 473, connection 482ª, curved link 482, pivot 483, arm 66, link 67, T-lever 167, and the described connections which support the pad or tool by the outer arm of the T-lever. This direction of motion of the parts from the position shown by full lines in Fig. 3, continues until the pad reaches the brim portion or nearly so (Fig. 2), and as the same direction of motion continues past the dead center of thrust, the pad or tool begins to return toward the position shown in Fig. 2. It may be stated here that the operation just described is assuming that work has commenced at the apex of the hat and is to proceed up to the brim portion and back again to the apex where the pad is thrown off. Of course on some hats the operation commences at the brim portion and makes but one traverse to the apex. Assuming now that the pad is traversing away from the brim portion toward the apex, the continued motion of the levers and links shown diagrammatically in Fig. 3 carries the roll 474 around to a point where it engages another cam similar to the cam 475 but not illustrated in Fig. 2 because of its being located behind other parts. The location of said second cam is such as to produce a second quick access of movement of the arm 66 when the pad reaches the position shown in Fig. 2 on its return movement. Said second cam is preferably adjustably mounted on or secured to the hub 476 as by means hereinbefore explained for the adjustment of the cam 460 on the disk 445, so as to permit proper adjustment as to the distance between the said second cam and the cam 475 to provide for varying shapes of hats. It is to be understood that other shapes or types of cam may be employed to accomplish the movement desired. Of course it will be understood that the shape of the cam 475, and also the second similar one, is such as to cause the desired relationship of the speed of traverse of the pad over the "square" and when approaching and leaving the "square". And said cam is preferably laterally inclined or so shaped that different speeds of traverse will be effected according to the portion of such cam that is engaged by the roll 474. To this end, the roll 474 (see Fig. 11) is laterally adjustable; in other words, it is adjustable along its axis of rotation. It is carried by a sleeve 492 which is or may be a part of the roll, said sleeve being mounted on a stud shaft 493 pinned in a casing 494 which is shown as a portion of the lever 473, said casing having of course an open side for the roll to project through. The outer end of the stud shaft 493 is threaded. A nut 495 engaging said threaded end has a portion engaging an annular groove in the sleeve 492 so that by rotating said nut, the sleeve and its roll will be shifted to bring the roll into position to engage such portion of the laterally tapered cam as may be desired. The action of the spring 491 is such as to keep the roll 474 in contact at all times, with the periphery of the hub 476 and with the cam or cams carried by said hub. Each time that the roll passes over a cam, the spring is of course compressed. Of course, when the parts are in, or nearly in, the position shown at Fig. 2, no spring such as 491 will perform any function because the greater portion of the weight of the parts is above the axis of rotation, and such weight alone will keep the roll 474 in contact with the upper face of the hub 476. But as the parts travel around to the position indicated by the dotted grouping in Fig. 3, the weight of the parts would then tend to cause the roll 474 to drop away from the face of the hub if the spring such as 491 were not employed. In other words, the construction is such, including the spring 491, that the roll 474 is caused to keep to its path of movement in practically the same manner as would exist if said roll were to traverse in a cam groove formed in the side face of a disk. The structure illustrated, however, permits of an adjustment of the cams, as has been described, which adjustment could not be readily effected by means of a cam groove in a disk. The curve of the slot 482$^b$ in lever 473 is generated from the axis of pivot 483 so that the pivotal connection 482$^a$ can be adjusted along said slot without varying the distance between pivots 472 and 483. By such adjustment, the length of stroke imparted to the link 482 can be varied from the maximum down to nothing, and therefore the effect of cam 475 in imparting access of motion to the cam 66, link 67, T-lever 167, and traverse of pad over the square, can be varied as may be desired.

It will now be understood that the structure just described is such that when the pad reaches the "square" or "danger point" of the hat, it is traversed rapidly thereover. And the shape of the cam or cams is, or may be, such that the sudden access of motion may be quick enough to prevent any possible damage by reason of too much pouncing operation on an exceedingly sharp "square". Also such cam or cams may be of such shape that they will act on the roll 474 in such manner that the pouncing tool will be caused to traverse the hat from tip to band at a constantly decreasing speed and from band to tip at a constantly increasing speed, this being a mere matter of cam construction, and such cams would have connection with the means for varying the speeds of the traversing movements of the tool just as has been heretofore described with respect to the cam 475.

The improvements described and claimed herein may be used in conjunction with the different mechanisms set forth in my pending application aforesaid, and in this connection I want to emphasize the fact that all of the improvements set forth in these two applications may be used conjointly in pouncing hat crowns, or, a number of these improvements may be used only. It may be here noted that the word "synchronous" is used to define an action which is in tune with an action of another part. Therefore, it will be readily understood that the present application sets forth improvements that are not in the nature of mere additions to the structure covered in my aforesaid pending application, but that one, two, or more of said improvements may be combined with said structures so as to operate conjointly to produce a unitary result.

I claim:

1. A machine of the character described, comprising a rotatable hat support, a traversing tool, means for reciprocating said tool relatively to the hat, and means for varying the length of the stroke of said tool during its traversing movements.

2. A machine of the character described, comprising a rotatable hat support, a tool, means for reciprocating said tool, and automatic means for reducing the length of the reciprocations when the tool is operating on the "square" of the hat.

3. A machine of the character described, comprising a rotatable hat support, a tool, means for reciprocating the tool, and means for automatically varying the length of the reciprocations for different portions of the hat.

4. A machine of the character described, comprising a rotatable hat support, a tool, means for reciprocating the tool, means for varying the length of the reciprocations of the tool when operating on different portions of the hat, and means for also varying the speed of such reciprocations.

5. A machine of the character described, comprising a rotatable hat support, a tool, means for reciprocating the tool, means for automatically varying the pressure of the tool on different portions of the hat, and means for varying the length of the reciprocations of the tool.

6. A machine of the character described, comprising a rotatable hat support, a tool, means for reciprocating the tool, means for automatically varying the length of such reciprocations, means for automatically varying the pressure of the tool on the hat, and means for automatically changing the operative position of the tool on the hat.

7. A machine of the character described, comprising a rotatable hat support, a tool, means for traversing the tool over the hat, and means for automatically imparting a predetermined irregular varying speed of traverse of the tool.

8. A machine of the character described, comprising a rotatable hat support, a tool, means for traversing the tool over the hat, means for automatically varying the speed of traverse of the tool, means for establishing a uniform pressure of the tool circumferentially of the hat, and means for automatically varying the pressure of the tool on different portions of the hat.

9. A machine of the character described, comprising a rotatable hat support, a tool, means for reciprocating the tool, means for traversing the tool over the hat, means for automatically varying the length of the reciprocations of the tool, and means for automatically varying the speed of traverse of the tool over the hat.

10. A machine of the character described, comprising a rotatable hat support, a tool, means for reciprocating the tool, means for automatically varying the length of the reciprocations of the tool, means for automatically varying the pressure of the tool upon the hat, and means for automatically varying the speed of traverse of the tool over the hat.

11. A machine of the character described, comprising a rotatable hat support, a tool, means for reciprocating the tool, means for automatically varying the length of reciprocations, means for varying the speed of the reciprocations, means for automatically varying the pressure of the tool on the hat, and means for varying the speed of the traverse of the tool over the hat.

12. A machine of the character described, comprising a rotatable hat support, a tool, means for effecting a continuous pressure of the tool against the hat, means for rendering said pressure uniform between the "square" and band portions of the hat, and means for relaxing said pressure as the tool traverses the "square" of the hat.

13. A machine of the character described, comprising a rotatable hat support, a tool, means for establishing a predetermined uniform pressure of the tool against the hat circumferentially of the hat, and means for varying the pressure of the tool as its point of operation shifts transversely of the hat.

14. A machine of the character described, comprising a rotatable hat support, a tool, means for establishing a predetermined uniform pressure of the tool against the hat circumferentially of the hat, and means for relaxing the pressure intermediate the apex and band portions of the hat.

15. A machine of the character described, comprising a rotatable hat support, a traversing tool, and automatic means for causing said tool to exert a pressure against the sides and top of a hat crown but to be bodily removed from the square of the hat.

16. A machine of the character described, comprising an oval lathe, a rotatable hat support carried thereby, a tool, means for adjusting the normal pressure of the tool against the hat, means for rendering said pressure uniform between the "square" and band portions of the hat, and means for relaxing said pressure as the tool traverses the "square" of the hat.

17. A machine of the character described, comprising an oval lathe, a rotatable hat support carried thereby, a tool, means for establishing a predetermined uniform pressure of the tool against the hat circumferentially of the hat, and means for varying the pressure of the tool as its point of operation shifts transversely of the hat.

18. A machine of the character described, comprising an oval lathe, a rotatable hat support carried thereby, a tool, means for establishing a predetermined uniform pressure of the tool against the hat circumferentially of the hat, and means for relaxing the pressure intermediate the apex and band portions of the hat.

19. A machine of the character described, comprising a rotatable hat support, a tool, means for effecting a continuous pressure of the tool against the hat, means for rendering said pressure uniform between the "square" and band portions of the hat, and automatic means for relaxing said pressure as the tool traverses the "square" of the hat.

20. A machine of the character described, comprising a rotatable hat support, a tool, means for establishing a predetermined uniform pressure of the tool against the hat circumferentially of the hat, and automatic means for varying the pressure of the tool as its point of operation shifts transversely of the hat.

21. A machine of the character described, comprising a rotatable hat support, a tool, means for establishing a predetermined uniform pressure of the tool against the hat circumferentially of the hat, and automatic means for relaxing the pressure intermediate the apex and band portions of the hat.

22. In a hat pouncing machine, the combination of a rotatable hat support, a reciprocating pouncer pad, means for normally holding the pouncer pad in engagement with the hat body, and means to limit the amount of pressure of the pouncer upon the squares of the hat.

23. In a machine of the character described, means adapted to rotate a hat, a tool, means adapted to cause a relative movement of said rotating hat and tool in a path extending from the apex to the brim of the hat, and means adapted to decrease the pressure of the tool against the hat as its convexity in the direction of said path becomes greater and to increase it as the convexity lessens.

24. In a machine of the character described, means adapted to rotate a hat; a tool, means adapted to cause a relative movement of a hat upon said rotating means and said tool in a path extending from the apex to the brim of the hat, means adapted to reciprocate said tool, and means adapted to increase the reciprocatory travel of said tool as the convexity of said hat in the direction of said path becomes greater and decrease said travel as the convexity lessens.

25. A machine of the character described, comprising a rotary hat support, a traversing tool, means for increasing or decreasing the speed of the traversing movements of said tool, means for reciprocating said tool, and means for increasing and decreasing the speed of the reciprocating movements of said tool in harmony with the decrease and increase of the traversing movements thereof.

26. A machine of the character described, comprising a rotary hat support, a traversing tool adapted to operate against a hat mounted on said support, means for constantly reciprocating said tool, means for causing said tool to continuously press against the hat, means for automatically varying the speed of the reciprocations of the tool, and means for automatically varying the pressure of the tool in harmony with the variations in the reciprocations thereof, and during the entire traversing movements of said tool.

27. In a machine of the character described, means adapted to support a hat, a reciprocating tool mounted to co-act with a hat upon said supporting means, and means adapted to vary the length of reciprocatory stroke of said tool automatically in accordance with its convexity in a direction toward the apex of the hat.

28. In a machine of the character described, means adapted to support a hat, a reciprocating tool mounted to co-act with a hat upon supporting means, and means adapted during the action of said tool upon said hat, automatically to vary the length of its reciprocatory stroke in accordance with its position upon the hat.

29. In a machine of the character described, means adapted to support a hat, a tool adapted to co-act with a hat upon said supporting means, means adapted to move said tool relatively to said hat over the surface thereof, means adapted to press said tool against said hat, and means adapted to increase said pressure as the tool co-acts with the portions of the hat adjacent the brim.

30. In a machine of the character described, means adapted to support a hat, a tool adapted to co-act with a hat upon said supporting means, means adapted to move said tool relative to said hat over the surface thereof, means adapted to press said tool against the sides of said hat, and means adapted automatically to increase said pressure as the tool co-acts with the portions of the hat adjacent the brim.

31. In a machine of the character described, means adapted to support a hat, a tool adapted to co-act with a hat upon said supporting means, means adapted to move said tool relative to said hat over the surface thereof, means adapted to press said tool against the sides of said hat, and means adapted automatically to increase said pressure as the tool co-acts with the portions of the hat adjacent the brim and decrease said pressure as the tool acts upon the square of the hat.

32. In a machine of the character described, means adapted to support and rotate a hat, means adapted to move the axis of rotation of said hat synchronously with its rotation, a reciprocating tool mounted to co-act with a hat upon said supporting means, and means adapted to vary the length of reciprocatory stroke of said tool during its action upon said hat.

33. In a machine of the character described, means adapted to support and rotate a hat at an angular rate of rotation varying synchronously with its rotation, means adapted to move the axis of rotation of said hat synchronously with its rotation, a tool adapted to co-act with a hat upon said supporting means, and means adapted to vary the pressure of the tool against the hat during its action thereon.

34. In a machine of the character described, means adapted to support and rotate a hat at an angular speed which varies synchronously with its rotation, a tool adapted to co-act with a hat upon said supporting means, and means adapted automatically to vary the pressure of said tool against the said hat during its action thereon.

35. In a machine of the character described, means adapted to support and rotate a hat, a tool, means adapted relatively to move said tool over said hat in a direction transverse to the plane of its rotation, means adapted to vary the pressure of said tool against said hat during said movement, and means adapted to change the position in said movement at which said pressure is varied.

36. In a machine of the character described, means adapted to support and rotate a hat, a tool, means adapted to move said tool relatively to said hat to traverse the surface of the hat at a uniform rate in a direction transverse to its plane of rotation, and means adapted to vary the speed of said traversing movement.

37. In a machine of the character described, means adapted to support and rotate a hat, a reciprocating pad, means adapted to move said pad relatively to said hat to traverse the surface of the hat in a direction transverse to its plane of rotation, and means adapted automatically to vary the speed of said traversing movement.

38. In a machine of the character described, means adapted to support and rotate a hat, a tool, means adapted to move said tool relatively to said hat to traverse the surface of the hat at a uniform rate in a direction transverse to its plane of rotation, means adapted to vary the speed of said traversing movement, and means adapted automatically to move the axis of rotation of said hat synchronously with its rotation.

39. In a machine of the character described, means adapted to support and rotate a hat, a tool, means adapted to move said tool relatively to said hat to traverse the surface of the hat at a uniform rate in a direction transverse to its plane of rotation, means adapted to vary the speed of said traversing movement, and means adapted to vary the angular speed of rotation of said hat synchronously with its rotation.

In testimony whereof I affix my signature in presence of two witnesses.

JAMES F. DORAN.

Witnesses:
F. W. SMITH, Jr.,
M. T. LONGDEN.